Figures 1, 2, 3:
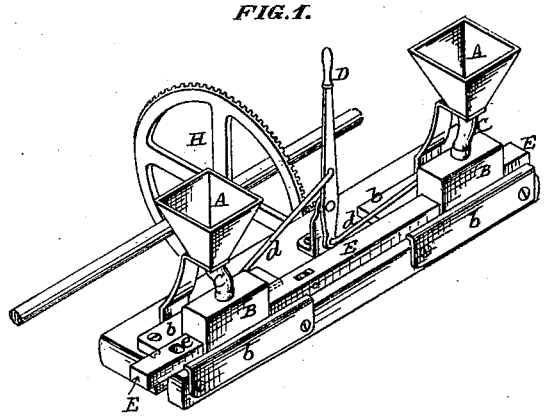

E. L. HALL.
CORN-PLANTER.

No. 179,785.

Patented July 11, 1876.

ATTEST:
Robt Burns.
Chas. J. Gooch

INVENTOR:
Edgar L. Hall
By Knight Bros
Attys

UNITED STATES PATENT OFFICE.

EDGAR LEWIS HALL, OF ST. LOUIS, MISSOURI.

IMPROVEMENT IN CORN-PLANTERS.

Specification forming part of Letters Patent No. 179,785, dated July 11, 1876; application filed June 16, 1876.

*To all whom it may concern:*

Be it known that I, EDGAR L. HALL, of St. Louis, St. Louis county, State of Missouri, have invented a certain new and useful Improvement in Corn-Planters, of which the following is a specification:

This invention consists in imparting to the seed slide or bar a rapid endwise reciprocation, to insure the proper filling of the seed-cavities when within the boxes, and their certain and rapid discharge when carried out of the hopper. The boxes are made to slide endwise to the seed-bar, so as to expose the seed holes or cavities, to cause the discharge of the seed therefrom.

Figure 1 is a perspective view of the dropping apparatus. Fig. 2 is a transverse section, showing the seed-boxes in position to allow the seed-slide to drop its contained seed. Fig. 3 is a detailed transverse section, showing the position of the seed-boxes when the seed-slide is not carrying seed out of the boxes.

A A are the seed-hoppers, communicating with the seed-boxes B by flexible tubes or hose C. Said boxes are arranged in slides $b$, and are operated by a hand-lever, D, and connecting-rods $d$. E is the seed-slide, passing through the lower part of the boxes B, and provided with one or more seed-holes, $e$, passing through it, and closed at bottom, when the hole is within the box, by the bottom $b'$ of said box B, with which the seed-slide is in direct contact. The seed-slide has a rapid endwise reciprocation imparted to it by pitman F on crank $f$, the crank-shaft carrying a bevel-pinion, G, gearing with a large bevel-wheel, H, upon the main shaft, upon which are the ground-wheels of the machine.

The boxes have two positions, in one of which, as shown in dotted lines in Fig. 2, the seed hole or holes are not carried out of the boxes by the limited vibration or shaking of the seed-slide, but by their motion therein become filled with corn. In the other position of the boxes, as shown in Fig. 1, and in full lines in Fig. 2, the seed-holes are outside the ends of the boxes, and the corn drops from them onto the ground, the rapid reciprocation of the seed-slide shaking the seed from the hole in cases where it has become jammed therein.

Thus it will be seen that the holes $e$ are by my device both filled and emptied with certainty, which is not the case where the seed-slide has a simple entrance and exit into and out of the box for each deposition of seed upon the ground, for in this latter case the corn may become lodged above the seed-hole and not drop into it; or the seed may become jammed in the seed-hole and not fall out when in the dropping position. One seed-hole, $e$, may be used capable of holding enough seed for one hill, or a number of smaller holes may be used.

The operation is as follows: Ordinarily the boxes B are in such position that the seed-holes in their reciprocation do not pass out of the boxes B. (See dotted lines, Fig. 2.) When the machine arrives at a position for dropping the seed, the boxes are moved inward, (see full lines, Fig. 2 and Fig. 1,) so as to expose the seed-holes, and the corn is dropped or shaken out.

It will be understood that the time of dropping is governed by hand, and that the reciprocation of the feed-slide only insures the filling and emptying of the seed-holes.

I claim—

1. The seed-slide F, in combination with sliding seed-box B, constructed to operate substantially as set forth.

2. The seed-slide E, pitman F, crank $f$, bevel pinion and wheel G H, in combination with movable seed-boxes B B, operated by hand-lever D, with flexible connection to hoppers A, substantially as set forth.

In testimony of which invention I have hereunto set my hand.

EDGAR L. HALL.

Witnesses:
SAML. KNIGHT,
ROBERT BURNS.